United States Patent
Quatro

(10) Patent No.: US 7,605,696 B2
(45) Date of Patent: Oct. 20, 2009

(54) SYSTEM AND METHOD FOR REAL TIME LOCATION TRACKING AND COMMUNICATIONS

(76) Inventor: Cary Quatro, 7507 Melinda Ct., SE., Byron Center, MI (US) 49315

( * ) Notice: Subject to any disclaimer, the term of this patent is extended or adjusted under 35 U.S.C. 154(b) by 303 days.

(21) Appl. No.: 11/313,352

(22) Filed: Dec. 21, 2005

(65) Prior Publication Data

US 2007/0139191 A1    Jun. 21, 2007

(51) Int. Cl.
  *G08B 1/08* (2006.01)
  *G08B 13/14* (2006.01)
  *G06K 9/00* (2006.01)

(52) U.S. Cl. .............................. 340/539.13; 340/572.1; 382/103

(58) Field of Classification Search ... 340/568.1–572.9, 340/539.13, 5.2, 3.1; 382/103, 154, 285; 715/763
See application file for complete search history.

(56) References Cited

U.S. PATENT DOCUMENTS

| | | | |
|---|---|---|---|
| 5,793,882 A | 8/1998 | Piatek et al. | |
| 5,805,289 A * | 9/1998 | Corby et al. | 356/613 |
| 6,424,264 B1 * | 7/2002 | Giraldin et al. | 340/573.1 |
| 6,750,769 B1 | 6/2004 | Smith | |
| 6,854,010 B1 | 2/2005 | Christian et al. | |
| 7,295,119 B2 * | 11/2007 | Rappaport et al. | 340/572.4 |
| 2004/0217864 A1 * | 11/2004 | Nowak et al. | 340/572.1 |
| 2005/0001720 A1 | 1/2005 | Mason et al. | |
| 2007/0085690 A1 * | 4/2007 | Tran | 340/573.1 |

* cited by examiner

*Primary Examiner*—Jennifer Mehmood
(74) *Attorney, Agent, or Firm*—Robert J. Sayfie

(57) ABSTRACT

Disclosed is a system and method for tracking location of objects (personnel) at a site. The system comprises: a central server, plurality of remote locator tags disposed on the objects, plurality of remote repeater devices capable of transmitting data signals to locate the locator tags, receiving location data signals from the locator tags, and transmitting the location data signals to the central server. A plurality of databases having location information are connected to the central server and a processing unit with a tracking software operably connected to the central server, compiles and assembles the location data signals and location information for tracking the objects at the site, thereby establishes a real time location tracking and communication with the objects. The system also enables setting up ad-hoc networks fully functioning on power and signals independent of the primary systems of the site and enhances decision making in real time environment.

19 Claims, 7 Drawing Sheets

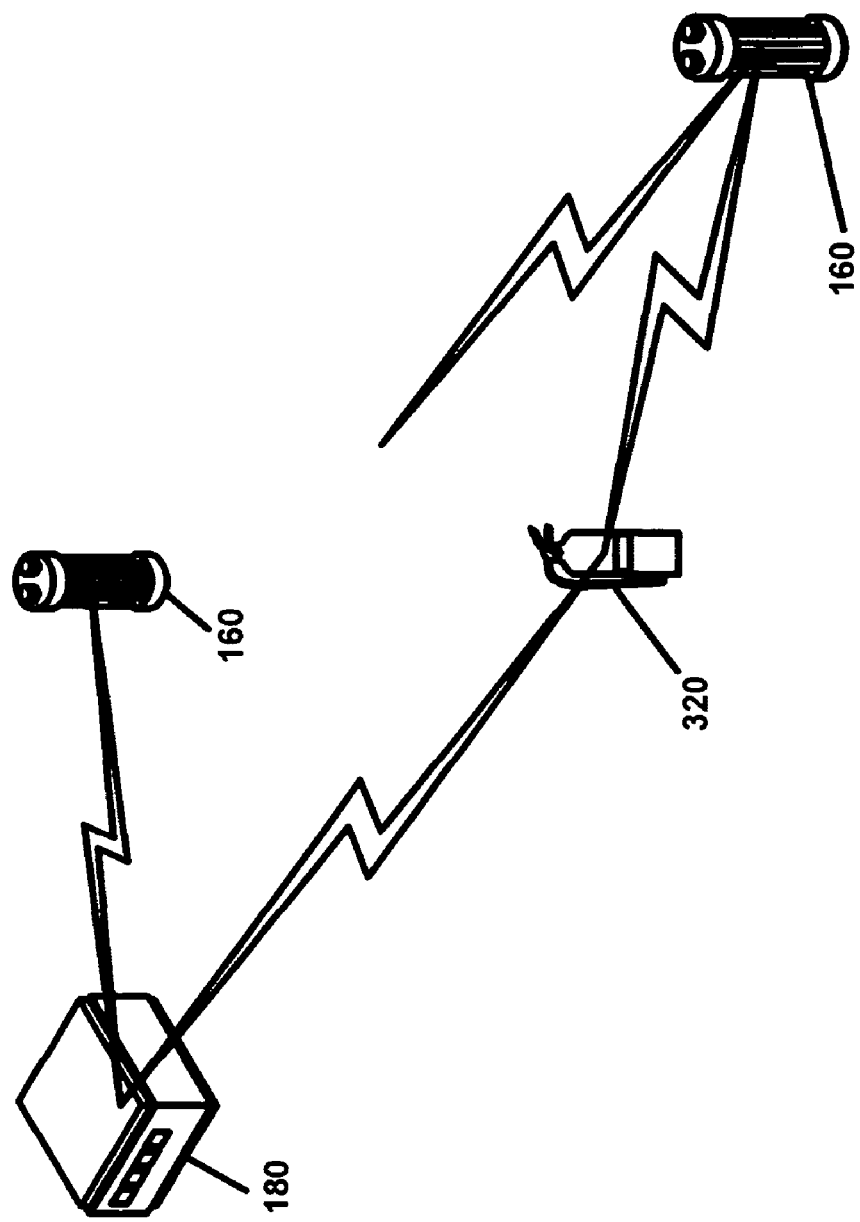
FIG 1-A

SYSTEM AND METHOD FOR REAL TIME LOCATION TRACKING AND COMMUNICATIONS

FIELD OF THE INVENTION

The present invention relates generally to a location tracking and communication system, and, more particularly, to a system and method for tracking, maintaining, and communicating exact locations of personnel at a real time basis, for accountability, information, and decision making process purposes.

BACKGROUND OF THE INVENTION

In times of catastrophic events such as earthquakes, floods, fires, radiation/hazardous material leaks, and even the terrorist activity as seen on 9/11, when entire grids of power, cell/telephone, electrical systems, communication systems, and other internal systems/services to the structure and on the site may be interrupted, pre-wired systems could also be damaged, and further impede the progress of location tracking of personnel or objects even though existing location tracking systems should be present. In these situations, the first responder groups provide law enforcement, safety, and protection services to the public. The first responder groups include organizations and law enforcement officers/personnel like police, sheriff, FBI, DEA, military personnel, highway patrol, detectives, special law enforcement groups, border patrol, firefighters, emergency medical services personnel, Red Cross personnel, and other emergency workers.

The work of first responder groups is very challenging. During the catastrophic events, the first responder groups have the responsibility to respond quickly and effectively in order to save life, property/assets of people. The life, health of personnel responding to catastrophic events is always on danger because in these situations, without an effective location tracking and communication system, it is very difficult for the first responder group to track exact locations effectively and quickly while providing law enforcement, safety, and protection services to the public. Therefore, it is very necessary for first responder group to correctly identify and maneuver through the site (may include, building structures and the like) efficiently, and also knowing the structural integrity and material construction of the building, for example, in strategic personnel extraction activities (usually planned outside the site), if there is a choice between a steel wall and a plaster wall, which should be used as an escape route. Further, all stairwells, elevators, access point locations, and possible exit points within the structure that could accommodate basic duties, rescue operations, and personnel extraction, will be evident on the architectural drawings and first responder group should also have a system for real time ubiquitous communication between all first responder groups.

Therefore, it is very important to provide enough real time and accurate information to first responder personnel in order to assist them in strategic planning initiatives so that they could make more intelligent decisions before entering any structure during a catastrophe or other event. Attempts have been made in the prior arts to provide location tracking systems.

U.S. Pat. No. 5,793,882 discloses a personnel accountability system that accounting for personnel reporting to a site. The personnel accountability system includes an information receiving device, a processor, and a display. The information receiving device is provided for receiving information from a data storage device carried by the personnel or from the personnel directly. The received information pertains to the personnel, and may include identification, qualification, and/or medical information. Upon receiving the data, the system subsequently stores and displays the received information. This system may also be used to receive information regarding a site.

U.S. Pat. No. 6,750,769 discloses a method and apparatus for using RFID tags to determine the position of an object. During operation, the system receives signals from an array of RFID tags at an RFID tag reader, wherein a mask of known size and shape is interposed between the array of RFID tags and the RFID tag reader, thereby obscuring signals from a subset of the RFID tags. Next, the system determines the position of the object by analyzing the pattern of obscured RFID tags, wherein the analysis is based on a known spatial relationship between the object, the mask and the array of RFID tags.

U.S. Pat. No. 6,854,010 discloses a centralized real-time multi-location management system that manages the exchange of location-level service data to a central server and also provides a secure firewall for the location-level systems through a network transceiver at each property. The network transceiver receives data from the location-level service and transmits and receives the data to and from the remote central server. At the central server, each property's data are integrated into a central database for use by a variety of central application services accessible by users through thin-client user interfaces.

United States Patent Application No. 20050001720 discloses a Firefighter Automated Accountability System (FAAS). This system supports automatic tracking and limited communications among first responders including fire, police, emergency medical service, and safety personnel. The FAAS integrate wireless mesh networks with positioning and communication systems to support real-time tracking of and communications with emergency response personnel. The FAAS incident awareness system provides position and time information via Global Positioning System (GPS) and/or other positioning systems, and processed data from sensors to provide enhanced communications, command and control capabilities to the first responders and incident command at the incident scene.

The prior arts/conventional systems have several limitations and disadvantages. While accomplishing specific objectives, prior arts do not provide adequate location tracking systems for: making intelligent decisions regarding the specific structures for deploying efficient activities within the structures; tracking and maintaining locations of rescue personnel, at a real time basis, for accountability, information, and decision making purposes; and real time ubiquitous communications between all first responder groups.

Therefore, there exist a need for a system for: tracking, maintaining, and communicating exact locations of first responder/rescue personnel at a real time basis; improving first responder/rescue personnel safety and ability to fight the catastrophic events/emergency situations more effectively by providing adequate and accurate information to them so that they could make more intelligent decisions before and after entering any structure during a catastrophe or other event.

SUMMARY OF THE INVENTION

In view of the foregoing disadvantages inherent in conventional location tracking systems, the general purpose of the present invention is to provide a system and method for real time location tracking and communications that includes all the advantages location tracking systems and overcomes the disadvantages/drawbacks inherent therein.

In one aspect, the present invention provides an effective and reliable system and method for real time location tracking and communications. The system and method of the present invention is capable of; allowing more than one individual/group to handle the situation simultaneously; allowing more cooperative measures, and better backup procedures; allowing more timely response to the situation; increasing personnel safety and improving their ability to fight the catastrophic events more effectively, securely, and quickly; making intelligent decisions regarding the specific structures for deploying efficient activities within the structures; allowing for real time tracking and maintaining locations of personnel for accountability, information, and decision making purposes; allowing for real time ubiquitous communications between all first responder groups; allowing for using battery powered equipments which could send signals to first responder groups for making them aware of potentially hazardous areas and alerting them to areas of contamination or leakage; allowing to set up and create ad-hoc networks fully functioning on power and signals outside and independent of the primary systems used by the structure and its surrounding environment; and allowing location tracking to be attained within random structures.

In another aspect, the real time location tracking and communications system of the present invention comprises: a central server, a plurality of remote locator tags disposed on the objects, a plurality of remote repeater devices, a plurality of databases connected to the central server, the databases having location information and a processing unit with a tracking software operably connected to the central server. The remote repeater devices are capable of transmitting data signals to locate the locator tags, receiving location data signals from the locator tags, and transmitting the location data signals to the central server. The processing unit with the tracking software is capable of compiling and assembling the location data signals and the location information for tracking the objects at the site, and thereby establishes a real time location tracking and communication with the objects.

In another aspect, the present invention provides a method for tracking location of personnel with locator tags, at a site. The method comprises: configuring a plurality of remote repeater devices within premises of the site; transmitting data signals from the remote repeater devices to locate the locator tags; receiving the data signals by the locator tags and reflecting back location data signals to the repeater devices; transmitting the received location data signals by the repeater devices to a central server having a plurality of databases with location information; compiling and assembling the location data signals and the location information by a processing unit with a tracking software operably connected to the central server; and establishing a real time location tracking and communication with the personnel.

In another aspect, the real time location tracking and communications system of the present invention comprises: a central server, a plurality of remote locator tags disposed on the personnel, a plurality of remote repeater devices, a plurality of databases connected to the central server, the databases having location information and a processing unit with a tracking software operably connected to the central server. The remote repeater devices are capable of: transmitting RFID/UWB data signals to locate the locator tags, receiving RFID/UWB location data signals from the locator tags, and transmitting the RFID/UWB location data signals to the central server. The location data signals provide a distinct static identification or serial number for the personnel. The static identification comprises a three dimensional representation of the personnel with respect to a referenced repeater device. The location information comprises blueprint diagrams of the site. The processing unit with the tracking software is capable of compiling and assembling the location data signals and the location information for tracking the personnel by plotting the three dimensional representation onto a grid of a blueprint diagram of the site to locate the personnel, and thereby establishes a real time location tracking and communication with the personnel.

These together with other aspects of the present invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the invention.

BRIEF DESCRIPTION OF THE DRAWINGS

The advantages and features of the present invention will become better understood with reference to the following more detailed description and claims taken in conjunction with the accompanying drawings wherein like elements are identified with like symbols, and in which:

FIG. 1A is an illustration of the functionality of the relay unit in the location tracking system, according to an exemplary embodiment of the present invention;

Like reference numerals refer to like parts throughout the several views of the drawings.

DETAILED DESCRIPTION OF THE INVENTION

Figure 1:
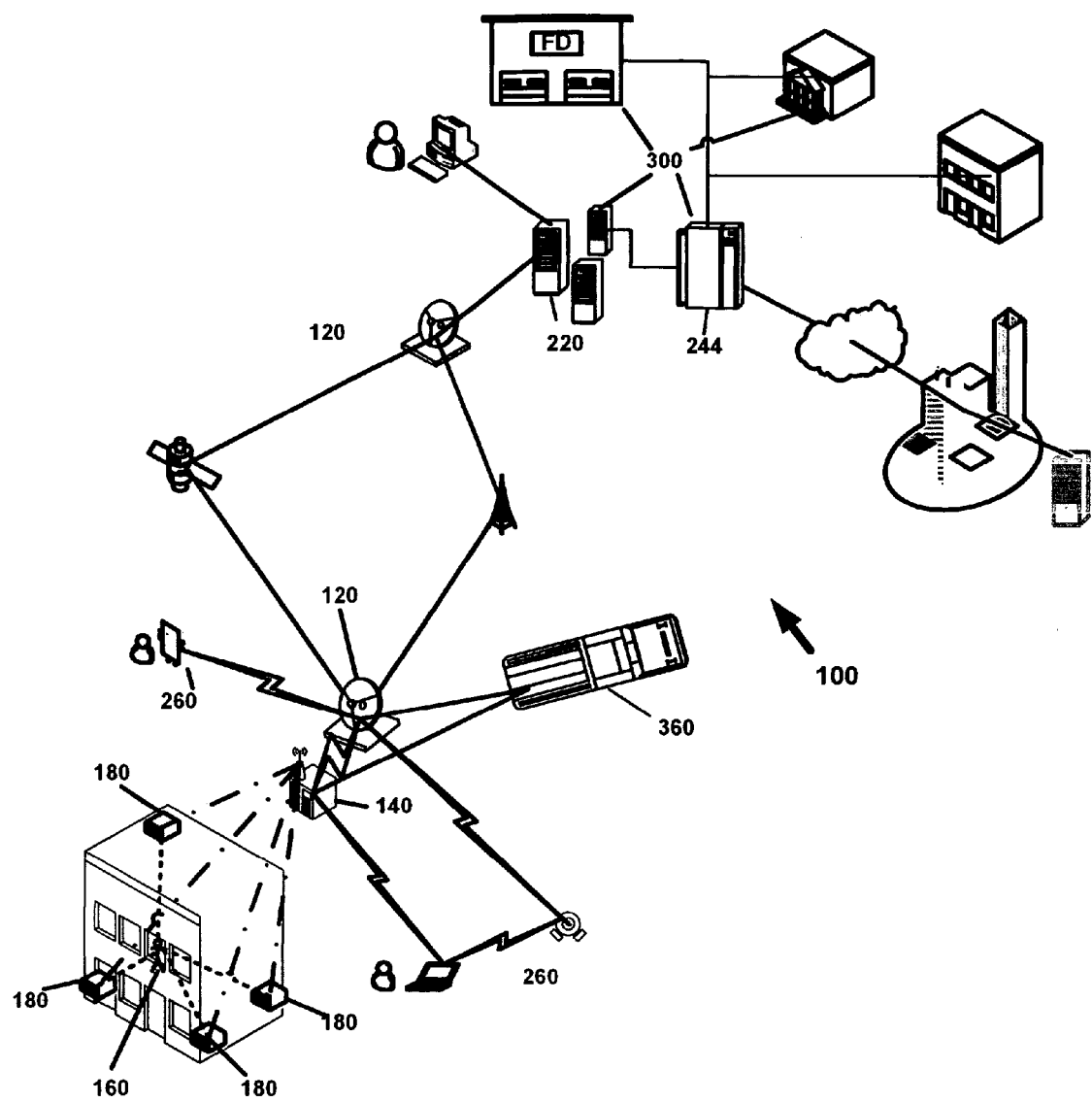
FIG. 1 is a detailed illustration of the location tracking system, according to an exemplary embodiment of the present invention.
Figure 2:
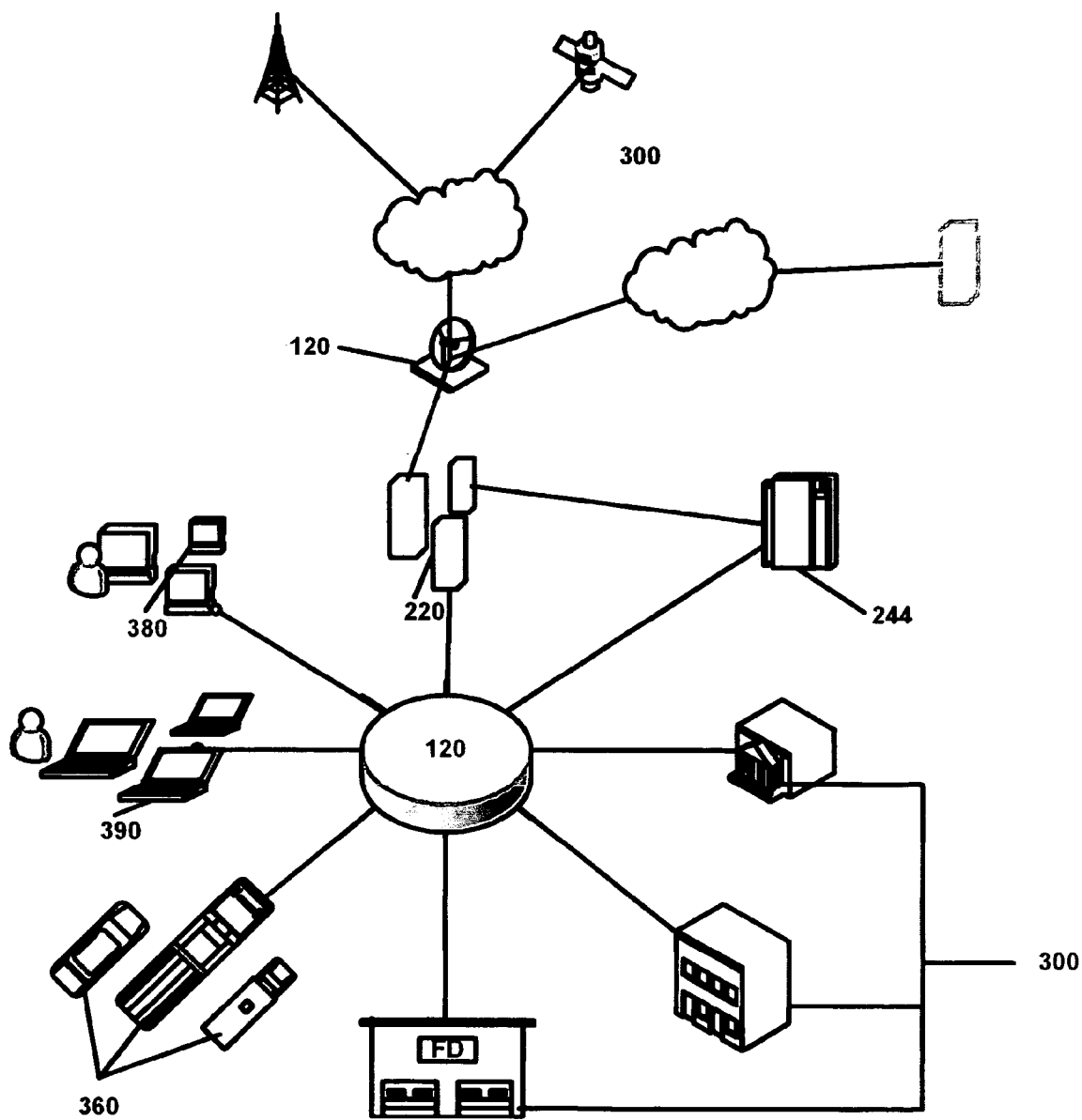
FIG. 2 is representation of the network and its related components, according to an exemplary embodiment of the present invention.
Figure 3:
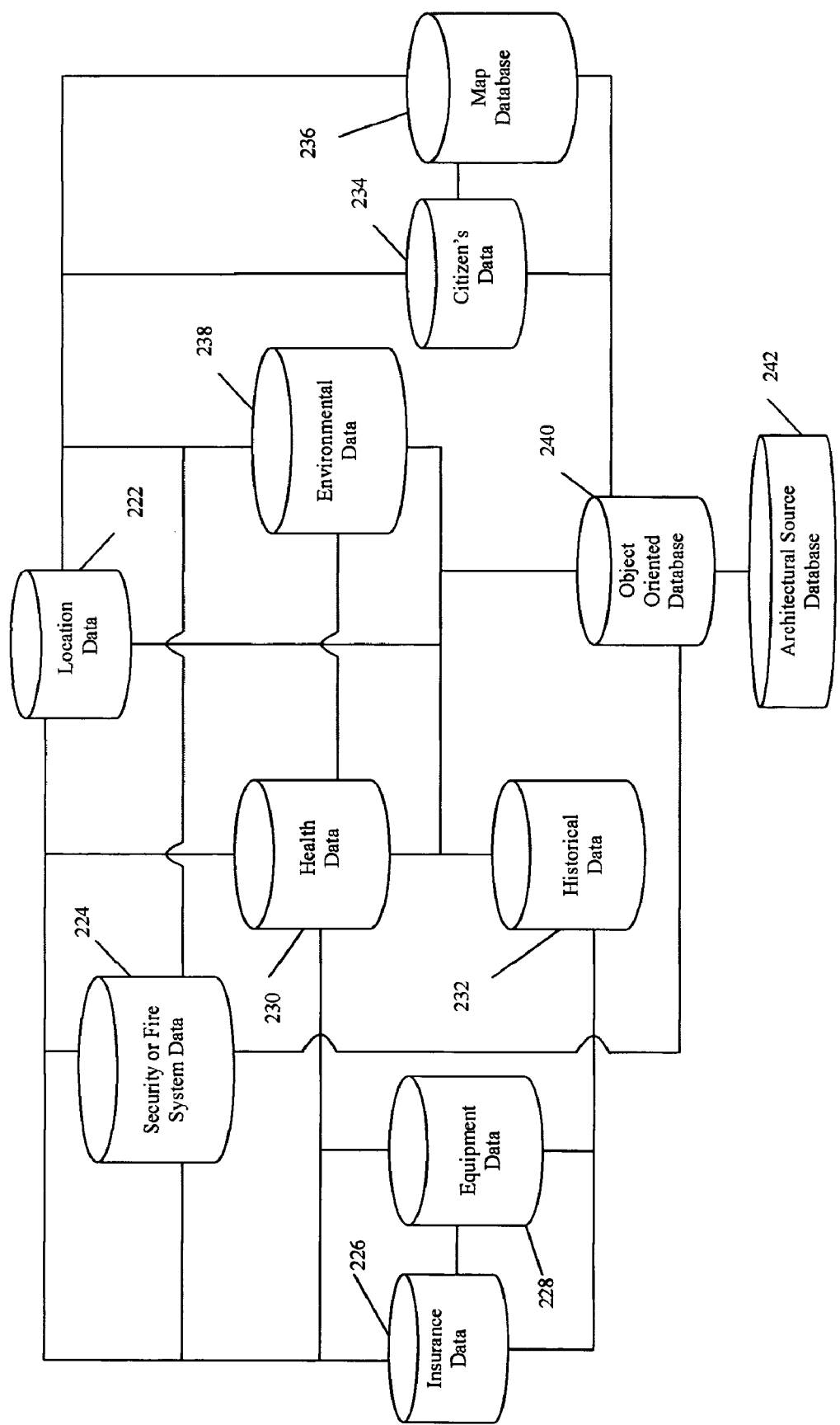
FIG. 3 is block diagram illustrating in detail the plurality of databases, according to an exemplary embodiment of the present invention.

The exemplary embodiments described herein detail for illustrative purposes are subject to many variations in structure and design. It should be emphasized, however that the present invention is not limited to a particular system and method for a real time location tracking and communications as shown and described. It is understood that various omissions and/or substitutions of equivalents are contemplated as circumstances may suggest or render expedient, but is intended to cover the application or implementation without departing from the spirit or scope of the claims of the present invention.

The present invention provides a system and method for a real time location tracking and communications (hereinafter referred as the 'location tracking system') to track and maintain personnel/objects locations within and surrounding building structures or sites via real-time network for accountability and informational purposes thereby allowing for cooperative measures, ability to begin operations immediately, allowing for timely response to a situation and better backup procedures.

The present invention find applicability preferably during times of emergency, surveillance, or safety precautions (i.e. fire, search and rescue, radiation leaks, Hazmat, etc.) and in times of catastrophic events wherein electrical systems, communication (cell/telephone) systems, and other internal systems to the building structure may not be functional. Further, during natural disasters such as earthquakes, floods, fire, and even during terrorist activities the entire of power, cell, telephone, and other services gets interrupted by the catastrophe. The location tracking system 100 of the present invention supplies an answer to this problem by using battery powered equipments and the ability to set up and create ad-hoc networks fully functioning on power and signals outside and independent of the primary systems used by the building structure and its surrounding environment instead of regular permanent tracking systems thereby reducing the cost of installation of the system components substantially and more specifically the power units which comprise a substantial element of the system installation cost. Because of this independence from structural amenities, the location tracking system 100 also allows tracking and location to be attained within random structures (e.g. abandoned warehouses, private residences, etc.).

FIG. 1, FIG. 1A, FIG. 2 and FIG. 3 explains in detail the present invention and provides for a location tracking system 100 for tracking a location of objects (for example, personnel) at a site (for example, in and around a building structure 110) in a real time network through a communication network 120. The location tracking system 100 comprises a central server 140; a plurality of remote locator tags 160 disposed on said objects, a plurality of remote repeater devices 180 (also known as 'lunchboxes'); a plurality of databases 220 connected to the central server 140, the databases 220 having location information (i.e., having information relevant to the location of objects, for example, blueprint diagrams of the building structures 110 and the like, security or fire systems, insurance related data, equipment related information of the building premises, health related information of the personnel, environmental related data, historical personal data, information regarding citizens, and the like); a; and a processing unit 260 with a tracking software operably connected to the central server 140 through the network 120 to track location of objects at the site.

The initial framework of the location tracking system 100 would be to configure a plurality of remote repeater devices 180 inside premises of the building structure 110 within which the search or location operation would be undertaken. The repeater devices 180 are transmitters capable of transmitting radio frequency signals. In one exemplary embodiment of the present invention, whether transmitting or receiving signals, the present invention may use any operable radio wave frequency, which includes, but is not limited to infrared, VHF, UHF, Bluetooth®, Wi-Fi, 802.xxx, RFID, and ultra wide band (UWB) signals. This use may be applicable for any component, including any transmitter, relay, transceiver, or server, or a device that is capable of receiving a frequency. The repeater devices 180 are capable of receiving and transmitting signals to the central server 140 having the plurality of databases 220 operably connected to it and to which the processing unit 260 with which the tracking software is connected. The repeater devices 180 may also include a large battery (not shown) to allow the signal strength to be even greater for penetrating deeper into the structure. The battery may be a re-chargeable battery. The repeater devices 180 may further include mini processor, a scale operating system, a port for synchronization (USB, fire wire or others) if necessary to other equipment, a software that will support the repeater devices' 180 operations and to upload or download media to and from the central server 140. The size of the repeater devices 180 may vary and in some embodiments may be as small as a palm pilot.

Pluralities of remote objects (personnel) with locator tags 160 coupled to them are sent inside the building structure 110. The locator tags 160 (capable of transmitting radio frequency identification (RFID)/ultra wide band (UWB) signals) have a size that is small enough to be easily embedded into existing equipment carried by the objects (personnel). Since the locator tags 160 are small and lightweight, they do not add significantly to the weight and volume carried by the objects (personnel), and thereby not restricting any movement due to the locator tags 160. Further, the locator tags 160 may be encased in an equipment to facilitate constant usage. In an additional embodiment, one more advantage of using ultra wide band UWB has also been found to have the potential for streaming back thermal information for object tracking and searches. If this is used in conjunction with this system, then the information would have a high probability of being able to assimilate these findings into the location tracking system 100, and allow personnel that are not tagged to be tracked solely by heat signature.

In an additional embodiment of the present invention if a higher bandwidth version of RFID/UWB is used, first responder groups 300 may also able to send back additional information across the frequency in addition to location information. This information may include, but are not limited to, health and system details of the first responder group and equipment. Also with UWB and thermal detection equipment, it could also be possible for the transmitters of the first responder groups 300 to send back video and/or other information that may be able to track and find objects that are not tagged or connected to the location tracking system 100 for search/rescue/recovery. Insurance information could also be derived from this information if recorded or saved.

In one embodiment of the present invention, a minimum of three repeater devices 180 are required for providing the three dimensional location of the objects (personnel) with the locator tags 160. However, the more the repeater devices 180, the better would be the results and thereby the tracking capability. The position of the repeater devices 180 are referenced to a static known architectural point within the building structure 110 to allow the location tracking system 100 and the tracking software at the processing unit 260 to focus on that point as an initial reference point. From that reference point, the tracking software can calculate the X-Y-Z coordinates of the locator tags 160 in reference to each remote repeater devices 180 to determine the exact location of the object within the building structure 110 by distances. These distances will then be correlated onto the blueprint diagram in reference to the remote repeater device's 180 referential locations on the blueprint diagram to illustrate the exact location of the object within the building structure 110. The repeater devices 180 transmit RFID/UWB signals within the premises of the building structure 110 and these signals are reflected back by the locator tags 160 on the objects (personnel) which in turn allow the repeater devices 180 to triangulate the object location by the strength and direction of the received signal. Each locator tag 160 on the objects (personnel) will provide a distinct static ID or serial for the individual or object that it is coupled to. The static ID would be the X-Y-Z coordinates in relation to a particular repeater device 180. The locator tag 160 may also be cross referenced to the objects that it is coupled to, i.e. if "Tag 1" is located on "Locator unit X", then the tracking software on the processing unit 260 of the location tracking system 100 will represent that "Locator unit X" is located where "Tag 1" is located.

The tracking software of the processing unit 260 can compile and assemble location information in the form of RFID/UWB signals from locator tags 160 transmitted by the repeater devices 180 and display the coordinates on a blueprint diagram of the building structure 110. As used herein, the blueprint diagram refers to technical drawings, architectural drawings and the like. The processing unit 260 receives the blueprint diagram of the building structures 110 from the plurality of databases 220 connected to the central server 140. Data streams i.e. RFID/UWB signals should be in a format that can be retrieved and assembled on the processing units 260 of these systems, and display the necessary information. In one embodiment, the tracking software will assemble RFID/UWB signal transmissions from locator tags 160 transmitted by the repeater devices 180 and place their location (i.e. the X-Y-Z coordinates) on a grid that will coincide with the blueprint diagram to precisely track the object inside or outside of the building structure 110. The signals from locator tags 160 will provide height and distance (i.e. X-Y-Z) coordinates for the object (personnel) in relation to the repeater devices 180 and other repeaters in time sequential data packets. If these repeater devices 180 are in location that can be placed near an area of architectural relevance (i.e. doors, stairwells, windows, or other notable objects that would appear on a blueprint diagram), the tracking software can assemble these coordinates and place them on a grid that will coincide with their geographical location within the blueprint diagram. If these areas do not exist in a building, then an Ad-hoc setup should ensure where the distance and location could be pinpointed by using the X-Y-Z coordinates of the location of the locator units 160 (personnel).

Figure 4:
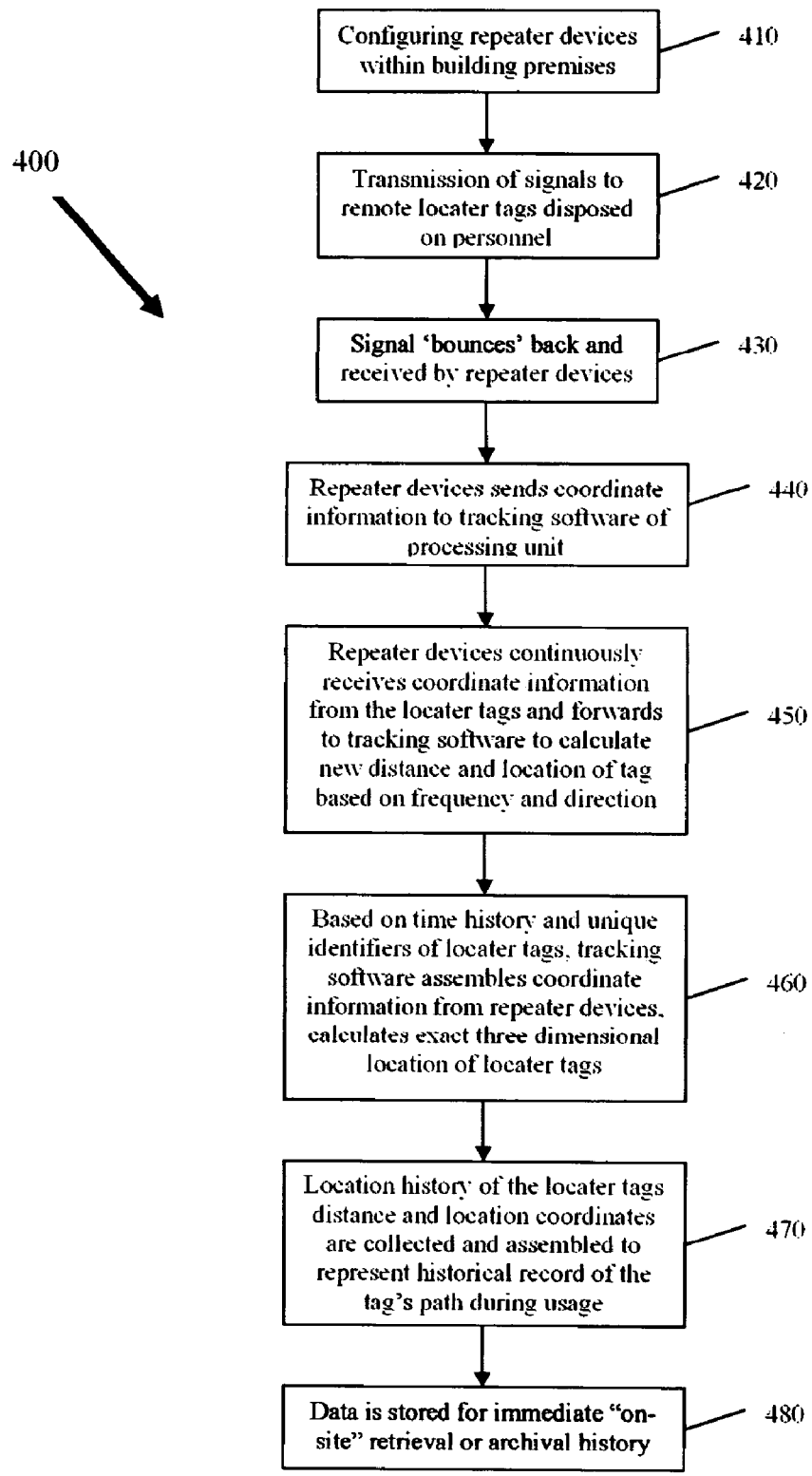
FIG. 4 is flowchart describing the process flow of the location tracking system 100, according to in an exemplary embodiment of the present invention.

The above operation of the location tracking system 100 is described in terms of the process flow shown in flowchart 400 of FIG. 4. The process begins with the installation and configuration of the remote repeater devices 180 in the building structure/site 110, as shown in step 410. The personnel with locater tags 160 spread across the building structure/site 110. The repeater devices 180 transmit signals to the remote locater tags 160 disposed on personnel at step 420. The signals may include, but are not limited to, RFIB/UWB signals, and the like. The remote locater tags 160 reflect back the received signals from the repeater devices 180 at step 430. The repeater devices 180 thereafter send the received reflected signals from the remote locater tags 160 to the tracking software in the processing units 260 at step 440. The repeater devices constantly keep transmitting signals within the building structure/site 110 and the remote locater tags 160 also continuously keep reflecting the signals back to the repeater devices 180. The reflected signals from the locater tags 160 contain the coordinate information along with the time history and the unique identifier corresponding to each locater tag 160, which are forwarded to the tracking software at the processing unit 260 at step 450. The tracking software then calculates the exact three dimensional location of the locater tag 160 based on frequency and direction of the locater tag 160 from the distinct location of each repeater device 180 at step 460. In one embodiment, it requires a minimum of three repeater devices 180 for calculating the time stamp of a locater tag 160. Upon calculating the location history comprising the locater tags distance and location coordinates of the locater tags 160, they are collected and assembled to represent historical record of the locater tags 160 movement during an operation and its usage at step 470. The relevant data of the location history is stored thereafter for immediate "on-site" retrieval or archival history illustrated at step 480.

All data could be assembled to incorporate any other additional information that could be passed along the data stream i.e. RFID/UWB signals from the object's equipment or other devices within the building structure 110 that include, but are not limited to, the temperature of the environment, the health status of personnel, the air tank status of personnel, the hazardous materials readings, the video surveillance, the video communications and the location of non-tagged objects within the building structure 110.

Figure 5:
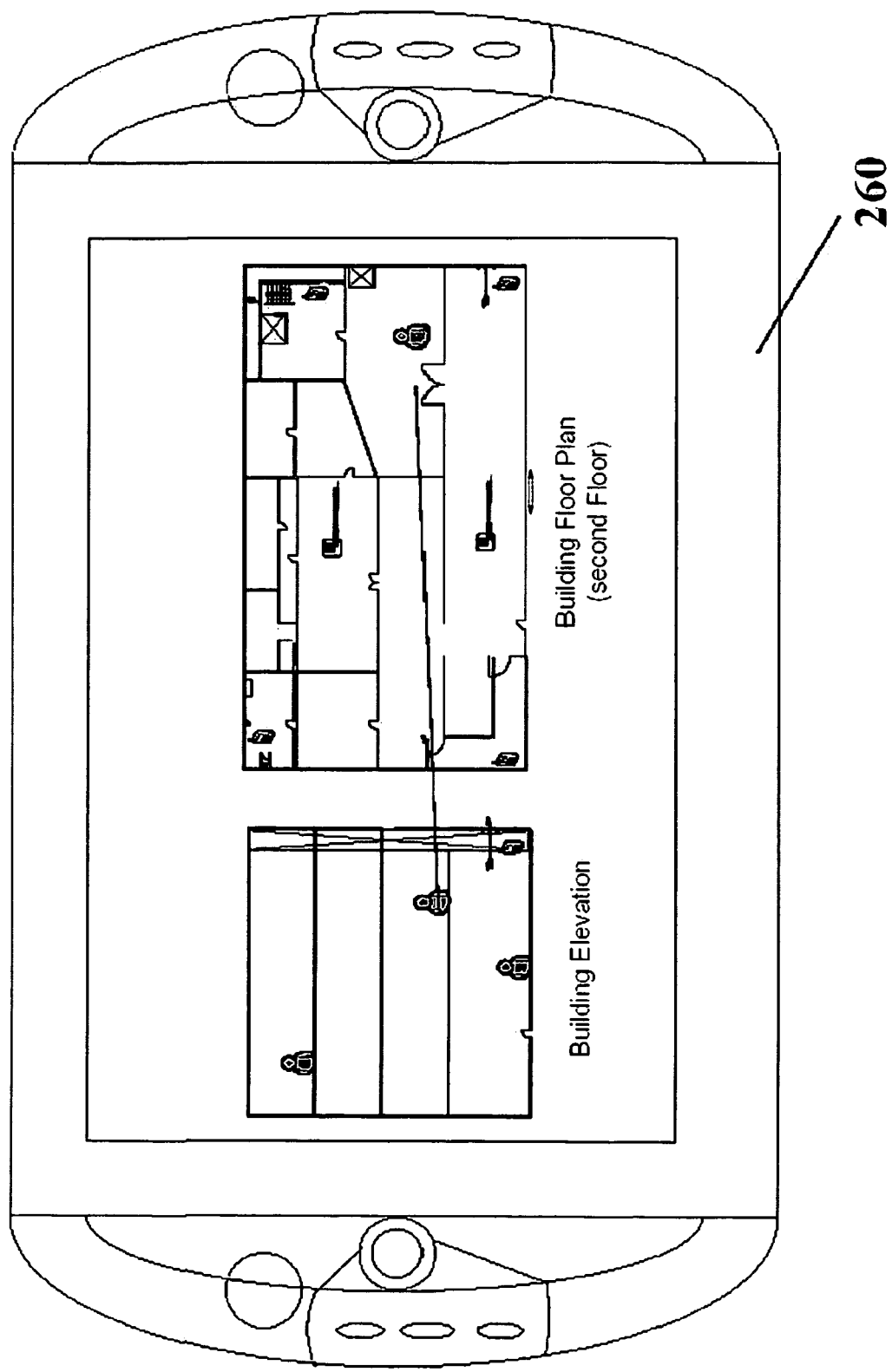
FIG. 5 illustrates the building elevation and the floor plan as seen in a processing unit 260, according to in an exemplary embodiment of the present invention.

The historical data from a historical database 232 is assembled by the software for future reference and data backup. Suitable historical data for the location tracking system 100 include, but are not limited to, object location history, personnel environment history, equipment history, and usage times. The tracking software displays simultaneous floor plan and elevation layouts of building. For example, as shown in FIG. 5, the tracking software displays the building elevation showing the personnel with the locater tags 160 spread out in different floors of the building structure 110, and parallely showing the distribution of the personnel with the locater tags 160 on a single floor of the building structure 110. These views have the ability to be manipulated to choose exact floor to monitor on which side of the structure to view. This eliminates the potential to lose objects i.e. the personnel that are stacked or in the same X-Y locational coordinates but on separate floors or elevations. Also, the tracking software is capable of containing blueprint drawings of sewer lines (sanitary or storm), HVAC, electrical underground cable, natural gas, corn lines (cable, telephony, fiber optics), other gas storage or material of Hazmat consideration, and the like.

The function of the tracking software allows the handheld processing units 260 to look at the varying layers of the document (i.e. floor levels, electrical, pluming and HVAC details), and other information stored on the blueprint drawing. The location tracking system 100 will supply two separate views of the blueprint diagram, one that shows the elevation view, and allows the user to turn and view the elevation from different angles; and a floor plan view, which allows the user to scroll and select between the different floors. Once the RFID/UWB signals from the locator tag 160 are plotted within the blueprint constraints, a user could select the objects (i.e. personnel) via touch screens, function keys, mouse, or cursors to view the details on that object or his environment. These two separate types of resources may be tracked on separate layers (or levels) of the location tracking system 100 to provide more efficient resource tracking on either level.

The object (personnel) will be displayed in a section of the screen of the processing unit 260, showing vital information, and the ID. The location tracking system 100 will prioritize object (personnel) location in the list by their vital information (if tracked), so if a person is low on air, their ID will be at the top of the list to notify the managers that the individual will need to be exiting the structure soon to refill or to rest. The personnel IDs may be color coded on the screen to show different levels of health or activity. Also, the location tracking system 100 may allow the user to drill down on each personnel to obtain more detailed data on that individual's status, equipment, or even history.

By sing the blueprints diagrams of the building structure 110 and similar sites, the personnel may be able to correctly identify and maneuver through the building structure 110 efficiently, and may have knowledge about structural integrity and material construction of the building structure 110 to better plan strategic initiatives. (Example: in strategic personnel extraction activities (usually planned outside the structure), if there is a choice between a steel wall and a plaster wall, which should be used as escape route). Stairwells, elevators, possible exit points, and the like, may be evident on the blueprint drawings. The primary goal of the tracking software is to provide enough information to first responder groups to make more intelligent decisions based on real and accurate information before entering any site (for example, the building structure 110) during a catastrophe or other event.

The data streams i.e. the RFID/UWB signals will be transmitted in time sequences that will show the object location with a time/date stamp, which will be useful to track the locator tags' 160 movement over time and distance. The result will be the locator tags' 160 path for tracking purposes. These coordinates will then be plotted onto a grid with the blueprint diagram of the building structure 110, as a base. The tracking software will utilize an object oriented database from the plurality of databases 220 connected to the central server 140, to store blueprint files in their original or modified source code files. Other pertinent information already collected on governmental or other databases could also be "linked" or interfaced within the processing unit 260. This information may include items like registered pets, registered health challenged individuals (who may be unable to help themselves), owners of the building, and other necessary: information.

In an additional embodiment of the present invention, relay units 320 may also be either hardwired or retrofitted into the building structure's 110 existing communication systems including but not limited to electrical systems, protection equipment systems, to ensure that signals from the locator tags 160 of the objects (transceivers/receivers) are constant, and will not decay or degrade within the confines of the building structure 110. More specifically, in a site wherein the numbers of remote repeater devices 180 are quite far apart and the objects with the locator tags 160 are spread out, the reflected signals from the locator tags 160 may not be strong enough to reach to the remote repeater devices 180. Relay units 320 may also be necessary in dense structures or areas where transmissions could be impeded by environmental factors or physical material. These relay units 320 could either be wired into electrical framework of the building structure 110, or they may also be ad-hoc arrangement, and may be carried, and placed into use by personnel as they enter these sites (the building structure 110). The relay units 320 are capable of increasing the strength of RFID/UWB signals from the locator tags 160 and will allow the transceivers/receivers i.e. the remote repeater devices 180 to get better location readings on the objects, and they may also allow detailed data to be transmitted by increasing the bandwidth strength of the transmissions.

In addition to remote relay units 320, it is also possible to use hoses, and other equipment already entering the system to house these ad-hoc relay units. By retrofitting or adding a relay unit to the exterior of these equipment pieces, a relay network could be created with little or no change in procedure from the firefighting taskforce. Items like onsite hoses, fire pulls, and fire extinguishers may be fitted with a battery powered relay units that would be activated and powered when the items are deployed or put into use (i.e. fire pull would also act as switch to power on relay units to begin transmitting signals).

In another embodiment of the present invention, the location tracking system 100 may integrate an active relay unit with a small battery [not shown] to the emergency equipment systems already existing in the premises of the building structure 110, that allows the relay units 320 to be activated only when that emergency equipment onto which the relay unit is integrated to, is triggered (i.e. fire pull is pulled, or a fire extinguisher is removed from its base). Also, because these safety items are regulated, and are required to be checked and examined on a timely and periodic basis, the relay unit and their batteries within these items would also be examined consecutively. This additional point of security adds another battery powered signal/repeater to be used in conjunction with carrying and receiving signals within the structure, even in catastrophic events. Insurance premiums could also be reduced for structures that employ these devices, since they may be used to minimize fatality risk, and will aid in tracking damage path within the building structure 110.

If the building structure 110 is hardwired to have relay units 320 and necessary equipment for personnel tracking within the structure, and interfaced with other systems (i.e. smoke detector systems, UWB environmental information systems), the first responder groups 300 would have the necessary information to know where the problem is, and be able to strategize more effectively (based on amount of information available). When relay units 320 are hard wired into the structure and are integrated with a structure's fire safety alarm, and sensor systems, the location tracking system 100 can monitor any changes or distortions within the building structure's 110 environment for insurance or personnel safety purposes. However, for all pre-wired or hardwired systems, there should also be a battery backup or the addition of battery powered repeater devices and other signal equipment within safety equipment to maintain transmission system integrity in the event of power loss due to catastrophe. Suggestions for sites, like the building structures 110 that should be pre-wired or hardwired include schools, universities, stadiums, and other areas where there are large amounts of patrons. Nuclear facilities, chemical facilities, oil refineries, and other areas where materials on site could pose risks to any personnel entering the areas would also be locations where a hardwired solution is recommended. These facilities and structures that would require Hazmat responses should also incorporate battery powered sensors and detectors (repeater devices) which could send signals to first responder groups 300 to make them aware of potentially hazardous areas, and to alert them to areas of contamination or leakage.

For structural fires, the transmission from the fire detection system can track the path of the heat and fire. If integrated into the system, this information would be useful for personnel allocation, fire insurance analysis, material heat resistance readings, possible cause and direction of fire, and architectural response to catastrophe. The same is true of structural collapse, when the relay units 320 can reveal which areas collapsed at which moment using the historical tracking features and gauging variations in location or displacement of the sensors from their original positions. Also, when coupled with heat sensitive equipment, and smoke detectors, it is possible to track a fired weapon in a structure. This would be done by focusing detection on the heat differential of the discharged weapon and the environment. From here the location tracking system 100 could track the path and location of the weapon across the blueprint diagram.

If the building structure 110 is not pre-wired, then the blueprint diagram would still be retrieved on a system used by the first responder groups 300. The first responder group 300 would then be dispatched with repeater device 180 (lunchboxes), and drop them at architectural focal points (i.e. main doors, windows) for the location tracking system 100 to gain locational bearing before entering the building structure 110. The repeater device 180 would send signals to be reflected off the locator tags 160, and then be retrieved back by the repeater devices 180 to determine location of the personnel. The information would then be transmitted from the repeater device 180 to a central server 140 outside the building structure 110 that would assemble the information, and detail the locations in parallel, and in to the locations on the blueprint diagram.

Figure 6:
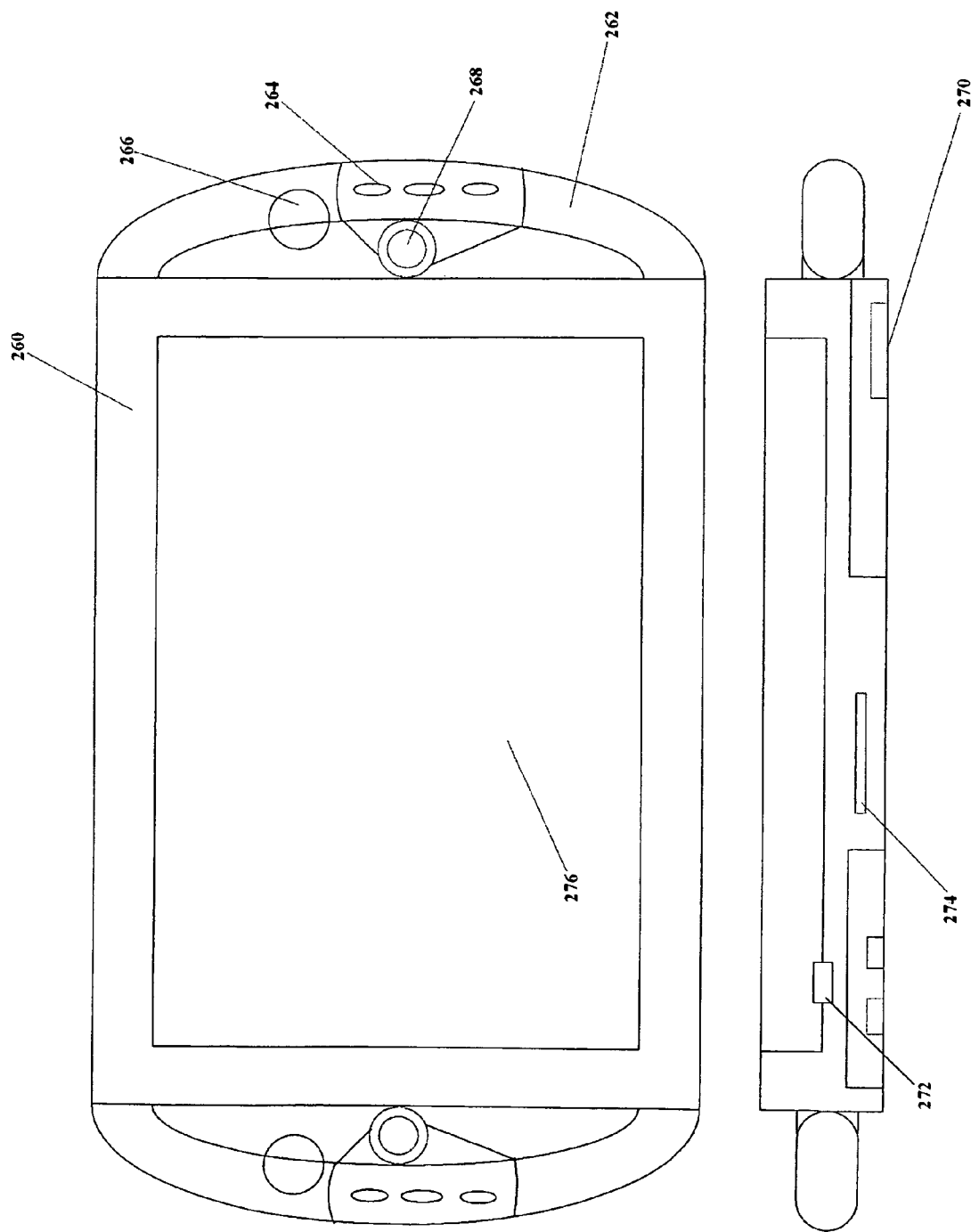
FIG. 6 illustrates an exemplary embodiment of the processing unit 260 of the present invention.

The processing unit 260 with tracking software (i.e., the static local workstations or dispatch groups 380; or multiple users/divisions 390) is connected to the central server 140 to centrally support the operation of remote devices (i.e., the locator tags 160 and the repeater devices 180), and allowing the ability to upload or download signals to the remote devices. The connection may be made through any type of known network including, but not limited to, a wide area network (WAN), a local area network (LAN), a global network (e.g. Internet), a virtual private network (VPN), intranet or wireless networks, metropolitan area network, future network configurations. The processing units 260 may be one or more computing devices (e.g., a desktop, a lap top, a personal digital assistant, tablet PCs, Transparent Systems, LLC mobile unit PCs) or a more sophisticated device such as a server. In one embodiment, the processing unit 260 is a Transparent Systems, LLC mobile unit PC. In this embodiment, the processing unit 260 may have a tablet PC with a liquid crystal display (LCD) screen and handles housing a plurality of selection and function buttons; wireless network card/network card to connect with LAN/WAN; and other features of a regular computing device. The Transparent Systems, LLC mobile unit is cased by a plastic sheet, such that, all the buttons and the screen and the other functional features of the Transparent Systems, LLC mobile unit will be housed inside the plastic sheet and protected from unsuitable environmental conditions outside. This makes the unit suitable for situations where water, soot, debris, sand, and other materials that may damage such units are present. In another exemplary embodiment, as shown in FIG. 6, the processing unit 260 has handles 262 that are disposed rightwardly and leftwardly of the processing unit 260 and has a substantially curved contour. On the handles 262 are the buttons 264 and a scrolling wheel 266. The buttons 264 can further comprise separate button 268 for direction control and for selection. The functions of the handle 262 can be tailored for either right or left handed controls by selection of the buttons 264. In a further exemplary embodiment of the present invention, the processing units 260 has a port 270 for charging of rechargeable batteries, synchronization, and/or for information exchanges, such as a Universal Serial Bus (USB) or Firewire interface. The port 270 may be a PS/2 Port for a keyboard or mouse terminal. Also, a barcode scanner 272 may be integrated so that the remote processing unit 20 can scan barcodes.

The remote processing unit 260 may also be equipped with a smart card slot 274, with a magnetic card reader operable with the smart card slot 274 to read information from such devices as driver's licenses, credit cards, or "frequent user" cards as part of a restaurant's marketing campaign. Liquor stores or gun stores may use to insert the drivers licenses of potential customers to check for probation violations, or criminal records before purchasing alcohol or guns, and also verify the authentication of drivers licenses or other forms of identification. Border security may use such processing units 260 to verify licenses, credentials, or other forms of identification, and the same can be stored as history of the persons in a particular locality. The information on the processing unit 260 is displayed on the screen 276. Furthermore, all ports or slots in the processing unit 260, in an exemplary embodiment of the present invention, may have protective airtight rubber (or other non-abrasive or oxidizing material) caps or plugs that would be inserted in them when not in use, thereby preventing damage to the unit through these access points.

A plurality of onsite responder vehicles 360 positioned near to a site of incident, more specifically the likes of a fire/ER vehicle which is capable of transmitting to the central server 140 is also connected to the same. Furthermore, organizations like the fire department, police department or city hall may also be connected to the central server 140 and forms an integral part of the same.

The central server 140 has the plurality of databases 220 within its operational vicinity. Useful databases 220 for the location tracking system 100 include, but are not limited to the location database 222 for accessing location tracking information at multiple locations, particularly, by the processing unit 260 and the remote objects (personnel) at the building structure 110; security or fire system database 224 having information regarding the fire systems installed in the building structure's 110 premises; insurance database 226 providing details of the insurance coverage of the equipment installations therein; equipment database 228 providing information regarding the various equipments installed within the premises; health database 230 containing the information regarding the health concerning details of the personnel in operation; historical database 232 having personnel history including location history, environmental history from environmental database (what environments worked in), equipment history and usage times, and the like, that may be used by the location tracking system 100 along with the tracking software in the processing units 260 for future reference and data backup; a citizen's database 234 provides the full details of the citizens of the locality; a map database 236 providing the map of the locality detailing the various routes to and out of the locality in case of emergency requirements; environmental database 238 (what environments worked in); an object oriented database 240 housing blueprint diagrams of the building structures 110 which is connected to various architectural sources 242. The location tracking system 100 further comprises a historical data backup database 244 connected to the central server 140 for backing up all the valuable information/data of all the above databases 220 that may be used by the location tracking system 100 along with the processing unit 260 with tracking software for future reference and data backup.

The blueprint diagrams from the object oriented database 240 may be retrieved on external and/or internal processing units 260, and on remote processing units as and when required. The tracking software of the processing units 260 extracts the location data thereby enabling better resource deployment, resource allocation, resource proximity to emergency or danger areas, resource extraction (injured, or need to evacuate quickly), resource history for future reference, resource exposure to hazardous materials and the like.

The processing units 260, i.e., one of the computing devices stated above further has a plurality of ports or slots for connecting additional devices or other equipment interfaces to a primary module of the computing devices. The ports or slots of the computing device have protective airtight rubber (or other non-abrasive or oxidizing material) caps or plugs that may be inserted into access points of these ports or slots when not in use, thereby preventing any potential damage to the computing device through these access points. The additional devices that are plugged into the unit may have protective coating around insertion point to prevent any material from seeping into the unit from the device's point of contact with the port. Suitable additional devices include, but are not limited to, USB or Fire-wire interfaces to upload or download tracking information; battery and related equipment, barcode scanners to scan equipment on site for inventory purposes, magnetic card readers for driver's licenses (possibly credit cards?) if device is interfaced with citizens database 232.

The processing units 260 have handles to allow the user to be mobile with the unit, and not confined to a seated or resting position to utilize the machine. Function buttons are present on the handles will allow easier access to the function keys, and quicker response and usability for the user. Also, the computing devices have scroll wheels to allow the device to scroll images on the screen, or add future additional functions to the device; thumb-pads on either side of the device to operate like touch-pads on laptops or direction buttons on game controllers to move the cursor. A mini joystick may be added to these thumb-pads to operate in more of a joystick fashion.

The location tracking system 100 may be used by a variety of first responder groups and other groups for to track and maintain personnel locations at numerous sites/structures. Firefighters may use the location tracking system 100 mobilize outside and inside of random or pre-wired structures. Also, the location tracking system 100 may be used transmit other information such as video and health stats back to the central system for maintenance and strategy.

Further, hospitals and other health centers may use the location tracking system 100 to track patients who are not allowed to leave restricted areas (i.e. dementia wards, nurseries), and also to track medications and equipment to ensure that the items are not stolen.

Further, amusement parks, gardens, and the like may use the features of the present invention to track the location of lost patrons, or prevent kidnapping. Children may be given locator tags 160 (for identification) when sent into the park, and the system would track their locations by use of towers installing components of the location tracking system 100 located around the park. Moreover, by incorporating a wireless network in the park, the information may be passed along the wireless network and transmitted to the devices worn by patrons. Also, the amusement park administration may place transmitters at each ride which would provide the geographic area focal points and allow the tracking software to position and place patrons in real time, and with accuracy.

Further, nuclear facilities/nuclear plants may use the location tracking system 100 within the existing framework of equipment the nuclear facilities/nuclear plants. Normal employees in these facilities are required to wear radiation sensitive equipment to measure the amount of radiation an employee is in contact with during a specified amount of time. By placing locator tags 160 in such equipments, or using the locator tags 160 and remote repeater devices 180 in conjunction such equipments, the nuclear facilities/nuclear plants not only track how much radiation an employee has been in contact with, but also area where radiation leaks may be occurring. For example, the location tracking system 100 will track the geographic location of the employee during their shift along the nuclear plant's blueprint diagram. If abnormal radiation readings occur on their personal sensors, the location tracking system 100 may track areas where the employee had been. Also, if another employee had strong radiation readings, the tracking software can track back both employees' tracks to centralize the highest probability areas of where radiation leaks may be occurring. This may be done by finding areas where both workers paths crossed or where the proximity was close. This ability to pinpoint the radiation will give the nuclear facilities/nuclear plants better reaction time for timely repair of radiation leaks, for better tracking ability of radiation levels within the nuclear facility/nuclear plant for environmental concerns, and for better tracking of employees when inside the nuclear facility/nuclear plant to promote homeland security.

Further, the location tracking system 100 may be used for tracking criminals/offenders by using the location tracking system 100 as a tether-like device. When inside a building or facility that is hard wired for the location tracking system 100, the whereabouts of the criminal may be tracked at all times; and when outside a building, the location tracking system 100 may be possibly sensitized to respond and give locations to cell towers, and other local equipment to cannibalize their bandwidth and send signals back to probation officers or police personnel. For example, when a criminal enters an area that they are prohibited from, an alarm would sound, and authorities would be aware of the intrusion or violation of order, for example, when an offender comes within a pre-defined range of a school or area where children are playing; or in this case, where a child is abducted from a known location, the tracking software may pinpoint the exact whereabouts of all tagged offenders that were in that area, at that specific time; or when there is violation near a school, an alarm may sound within the school administration to notify them that a potential breach has occurred near their facility. Also, the location tracking system 100 may be used for placing a restraining order on an individual. In violent cases, the victim who issued the complaint may be given a receiving device that will alert them when the individual is violating the order. In cases where the restraining order is for a facility, the facility security or owner may be notified that a breach or violation has occurred. In cases where the nonviolent criminals are placed back into society, they may be tracked continuously by law enforcement authorities of the individual's location at all times. This may alleviate prison overcrowding for governmental cost control, provide assistance to probation officers to track down parole violators, and would eliminate the need for archaic tether systems a wide area network could be established over a geographic location to track these devices (either through satellite, towers, and transmitters placed intermittently in local areas). Also, the bars may be equipped with the location tracking system 100 to announce the presence of habitual abusers that drive under the influence.

Further, EMS drivers may use a scale version of the location tracking system 100 to make their response time more efficient. When responding to an emergency, the EMS drivers may retrieve the information from the database regarding the location, and architecture. For example, apartment numbers may allow the EMS responders to be informed ahead of arrival of the exact location of the apartment and thereby result sin following features and advantages: EMS drivers may position their vehicle in the best possible location for client extraction; EMS drivers may be informed of stairwells and other architectural features; EMS drivers may possibly know the location of on-site Automated External Defibrillator (AEDs) or other equipment that could be of use; allow them to be more efficient in which material and/or equipment to bring to the emergency site; and hasten response time. All of above features would result in time efficient and cost effective processes for the EMS units.

Moreover, the location tracking system 100 may be used by bomb detection and removal personnel. When responding to an emergency, they would retrieve the information from the location tracking system 100 regarding the location, and architecture, i.e., the location tracking system 100 may allow bomb unit responders to be informed ahead of arrival of the exact location of the devices and thereby result in following features and advantages: can position personnel, vehicles, and equipment in the optimal locations for bomb extraction and defusing; bomb detection unit may be informed of stairwells, sewage pipes, gas lines, and other architectural features; may mobilize their robotic units, track and guide them with the location tracking system 100; may be aware of structural impacts of blasts, and potential areas to avoid bomb placement to mitigate damage to the structure or architectural bearing points (this would mitigate loss of life, loss of materials, or potential damage that could compromise the structural integrity of the structure). All of above features would result in time efficient and cost effective processes for the bomb detection units. Also, these features would mitigate insurance damage potential.

Also, the location tracking system 100 may be used by city planners and developers. They could retrieve information from the databases in the location tracking system 100 regarding the location, architecture, and structural history of buildings and such information may help in planning enhancements or reconstruction efforts for buildings. The city planners may examine how certain structures, materials, and architectural features handle the local environment or catastrophic events. Such information may also aid in determining if buildings have compromised structures and whether they should be eliminated. If the building could be eliminated, they could choose the best areas to insert demolition equipment to pose minimal external threats to surrounding structures and the environment. They would be informed of the internal architectural features, gas lines, sewage lines and potential areas that could create larger problems, and would allow them to be more efficient in which material and/or equipment to bring to the emergency site. Also, such information would allow them to better plan city resources, and utilize existing structures and buildings more effectively; and would allow them to have information on all structures in the area to analyze, and study for future planning efforts.

The foregoing descriptions of specific embodiments of the present invention have been presented for purposes of explaining the principles of the invention and its practical applications for enabling others skilled in the art to best utilize the invention and various embodiments with various modifications as are suited to the particular use contemplated. The illustration and description of exemplary embodiments of the present invention are not intended to be exhaustive or to limit the invention to the precise forms disclosed, and obviously many modifications and variations are possible in light of the above teaching. It is understood that various omissions, substitutions of equivalents are contemplated as circumstance may suggest or render expedient, but is intended to cover the application or implementation without departing from the spirit or scope of the claims of the present invention.

What is claimed is:

1. A system for location tracking of objects at a site, comprising:
    a central server;
    a plurality of remote locator tags disposed on said objects;
    a plurality of remote repeater devices configured at said site for
        transmitting data signals to locate said locator tags,
        receiving location data signals from said locator tags, and
        transmitting said location data signals to said central server;
    a plurality of databases connected to said central server, said databases having location information; and
    a processing unit with a tracking software operably connected to said central server said processing unit with said tracking software for compiling and assembling said location data signals and said location information for tracking said objects at said site, thereby establishing a real time location tracking and communication with said objects; wherein a distinct static identification comprises a three dimensional representation of said objects with respect to a referenced said repeater device, and said location information comprises blueprint diagrams of said site; and wherein said processing unit with said tracking software plots said three dimensional representation onto a grid of a blueprint diagram of said site to locate said objects.

2. The system of claim 1, wherein said system further comprises relay units for strengthening said location data signals from said locator tags, such that, said location data signals do not decay or degrade within premises of said site before being received by said remote repeater devices.

3. The system of claim 2, wherein said relay units are either pre-wired with communication systems of said site or fixed as an ad-hoc arrangement at said site.

4. The system of claim 1, wherein said location information comprises blueprint diagrams of said site.

5. The system of claim 4, wherein said location information further comprises site history information, object history information, environmental history information, equipment history information, location maps, citizens information, security information, fire system information, and insurance information.

6. The system of claim 1, wherein said data signals and said location data signals are any operable radio wave frequency.

7. The system of claim 1, wherein said location data signals provide a distinct static identification or serial number for said object.

8. The system of claim 7 wherein said static identification comprises a three dimensional representation of said object with respect to a referenced said repeater device.

9. The system of claim 1, wherein said remote repeater devices are referenced to a static known architectural point within said site to allow said system to focus on said architectural point as an initial reference point.

10. A method for location tracking of personnel with locator tags at a site, comprising:
    configuring a plurality of remote repeater devices within premises of said site;
    transmitting data signals from said remote repeater devices to locate said locator tags;
    receiving said data signals by said locator tags and reflecting back location data signals to said repeater devices;
    transmitting said received location data signals by said repeater devices to a central server having a plurality of databases with location information;
    compiling and assembling said location data signals and said location information by a processing unit with a tracking software operably connected to said central server, thereby establishing a real time location tracking and communication with said personnel; wherein a distinct static identification comprises a three dimensional representation of said personnel with respect to a referenced said repeater device, and said location information comprises blueprint diagrams of said site; and wherein a processing unit with said tracking software plots said three dimensional representation onto a grid of a blueprint diagram of said site to locate said personnel.

11. The method of claim 10, wherein said method further comprises configuring relay units for strengthening said location data signals from said locator tags, such that, said location data signals do not decay or degrade within premises of said site before being received by said remote repeater devices.

12. The method of claim 10, wherein said relay units are either pre-wired with communication systems of said site or fixed as an ad-hoc arrangement at said site.

13. The method of claim 10, wherein said location information comprises blueprint diagrams of said site.

14. The method of claim 13, wherein said location information further comprises site history information, object history information, environmental history information, equipment history information, location maps, citizens information, security information, fire system information, and insurance information.

15. The method of claim 10, wherein said data signals and said location data signals are at least one of either a radio frequency identification (RFID) or an ultra wide band (UWB) data signals.

16. The method of claim 10, wherein said location data signals provide a distinct static identification or serial number for said object.

17. The method of claim 16, wherein said static identification comprises a three dimensional representation of said object with respect to a referenced said repeater device.

18. The method of claim 10, wherein said remote repeater devices are referenced to a static known architectural point within said site to allow said processing unit with said tracking software to focus on said architectural point as an initial reference point.

19. A system for location tracking of personnel at a site, comprising:
  a central server;
  a plurality of remote locator tags disposed on said personnel;
  a plurality of remote repeater devices for
    transmitting RFID/UWB data signals to locate said locator tags,
    receiving RFID/UWB location data signals from said locator tags, and
    transmitting said RFID/UWB location data signals to said central server,
    wherein said location data signals provide a distinct static identification or serial number for said personnel;
  a plurality of databases connected to said central server, said databases having location information; and
  a processing unit with a tracking software operably connected to said central server said processing unit with said tracking software for compiling and assembling said location data signals and said location information for tracking said personnel, thereby establishing a real time location tracking and communication with said personnel; wherein said distinct static identification comprises a three dimensional representation of said personnel with respect to a referenced said repeater device, and said location information comprises blueprint diagrams of said site; and wherein said processing unit with said tracking software plots said three dimensional representation onto a grid of a blueprint diagram of said site to locate said personnel.

* * * * *